Jan. 18, 1966 C. F. HAUTAU 3,229,545
ACTUATOR
Filed Nov. 26, 1963
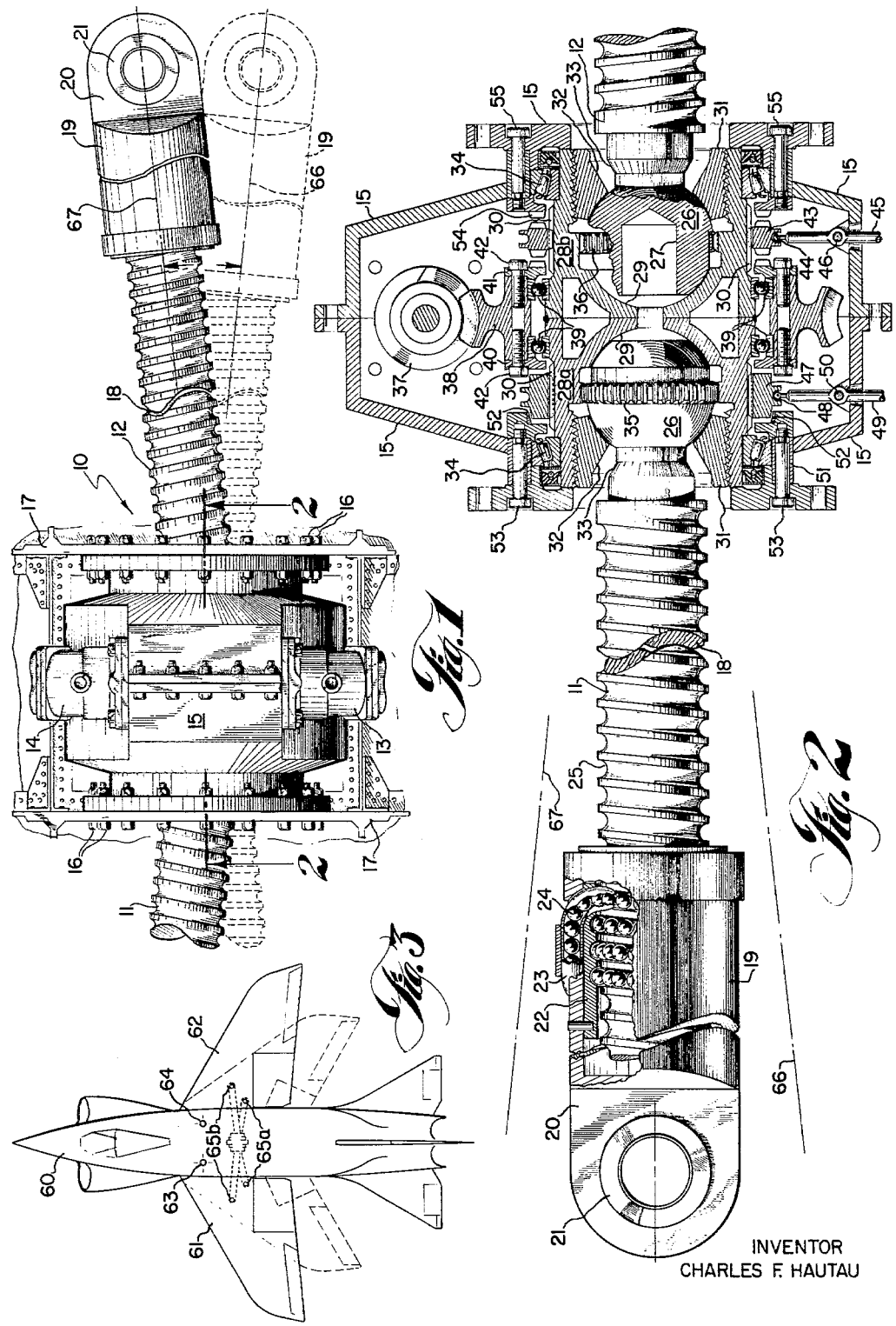
INVENTOR
CHARLES F. HAUTAU

United States Patent Office 3,229,545
Patented Jan. 18, 1966

3,229,545
ACTUATOR
Charles F. Hautau, Oxford, Ohio, assignor, by mesne assignments, to Apogee Consultants & Research, Incorporated, Dayton, Ohio, a corporation of Delaware
Filed Nov. 26, 1963, Ser. No. 326,051
5 Claims. (Cl. 74—424.8)

This invention generally concerns an actuator, and particularly relates to an actuator which may be utilized for controlling the wing sweep of aircraft of the variable swept-wing-type and for like applications.

The invention described and claimed herein includes a pair of opposed screw assemblies which are synchronously rotated to develop symmetrical extension and retraction of connected loads. Through a novel coupling construction I provide for required pivoting of each screw assembly within limits.

A primary object of this invention is to provide a screw and nut actuator with means for permitting pivotable movement of an included screw assembly relative to the drive portion of the actuator.

Another object of this invention is to provide a dual, screw and nut actuator with means for transferring imposed loads in bypass relation to structure supporting the actuator.

Another object of this invention is to provide a dual, screw and nut actuator with means for transferring imposed loads in bypass relation to included thrust bearings.

Another object of this invention is to provide a screw and nut actuator which has minimum space requirements for installation and operation.

A still further object of this invention is to provide a dual, screw and nut actuator with means for readily developing assured synchronous rotation of included opposed screw assemblies.

A further object of this invention is to provide a screw and nut actuator with means for readily developing engaged, freewheeling, braked, or locked operating conditions in included screw assemblies.

Another object of this invention is to provide an actuator which is extremely reliable in operation, which may be utilized to realize important weight savings, which may be economically manufactured, and which may be easily maintained.

Other objects and advantages of my invention will become apparent during a consideration of the drawings and the claims.

In the drawings:

FIG. 1 is a plan view of a preferred embodiment of the actuator of my invention;

FIG. 2 is a sectional view of the actuator of FIG. 1 taken at line 2—2; and

FIG. 3 is a plan view of an aircraft showing the actuator of my invention combined therewith to achieve wing-sweep control.

The actuator of this invention is referenced as 10 in FIG. 1 and includes screw assemblies 11, 12, power units 13, 14, and the casing designated 15. Casing 15 is provided to house the drive that couples power units 13, 14 to screw assemblies 11 and 12 and to assist in securing the actuator to ancillary supporting structure. In the preferred actuator embodiment of FIG. 1 two power units are shown, but for many applications one power unit is adequate. In the FIG. 2 arrangement a hydraulic motor 13 is provided for normal operation of the actuator and a pneumatic motor 14 is provided for use only in emergency situations and independently of power unit 13. Such power units are preferably of conventional configuration and design. Fasteners 16 are provided to connect actuator 10 to support structure 17 by securing the location of casing 15.

Each screw assembly 11, 12 includes a screw member 18 having a tubular attach fitting 19 at one end. Fitting 19 includes an integral tang 20 and a mounting bearing 21 at one extreme. A conventional ball-nut 22 is carried within attach fitting 19 in fixed relation at the other extreme and is provided with an endless raceway 23 and a ball train 24. Such ball train cooperates with thread 25 of screw member 18 in addition to endless raceway 23. Ideally, fitting 19 is sufficiently long so as to substantially contain the entire length of screw member 18 when the actuator is operated to a fully retracted condition. Also, a stop (not shown) is provided on the end of screw member 18 contained in fitting 19 to prevent its disengagement from ball-nut 22 when the actuator is operated to a fully extended condition. The opposite or other end of each screw assembly 11, 12 is provided with a ball head 26 of generally spherical configuration. Significant weight savings may be realized if each included ball head is provided with a recess such as 27.

A coupling 28 is provided in the actuator of this invention to connect screw assemblies 11, 12 to each other in rotationally synchronized relation. Such coupling may be made of joined sections (such as 28a and 28b) which are welded together as shown in the drawings. Each section of coupling 28 is provided with a generally spherical socket (seat) 29 which cooperates with a ball head 26. Coupling 28 is also provided with the external longitudinal splines designated 30. Retainers 31 threadably cooperate with each section of coupling 28 to secure the ball heads 26 of the screw assemblies in fixed longitudinal relation relative to each other. Stop surfaces 32 are provided in coupling 28 to limit pivotal movement of ball head 26 within socket 29 and of screw member 18 relative to casing 15 (and supporting structure). In doing so, a stop surface 32 cooperates with a shoulder 33 of the screw member. Tapered roller bearings 34 are provided to properly support coupling 28 within casing 15. The connection between coupling 28 and ball heads 26 is accomplished by means of spur gears 35 and annular gears 36. Each spur gear 35 is provided with convex-crowned gear teeth and is secured to a ball head 26 in fixed relation; each annular gear 36 is provided with concave-crowned gear teeth and is secured to coupling 28 in fixed relation. Gears 35 and 36 properly mesh at all times and even though the screw assemblies of the actuator are pivoted within sockets 29 within the limits shown.

The drive which serves to connect power units 13 and 14 to coupling 28 is also shown in detail in FIG. 2. Such drive consists of properly supported worm gear 37 and cooperating worm wheel 38. Worm gear 37 is rotatably driven by the power units. Ball bearing assemblies 39 are provided for rotatably mounting worm wheel 38 on coupling 28 and are retained in position by retainer members 40 and 41 utilizing fasteners 42. Retainer member 41 has an integral face gear portion for use in connecting worm wheel 38 to coupling 28 in fixed relation as hereinafter described.

A shifter ring 43 is provided in the invention for accomplishing several functions. Basically, such shifter ring is of double face gear construction. A generally semi-circular yoke 44 (shown in section only in FIG. 2) cooperates with the annular exterior groove of ring 43; movement of shifter ring 43 longitudinally of coupling 28 is accomplished by input forces applied to arm 45. Such arm rotates about axis 46 and is used to place the actuator in any of several preferred operation conditions. For instance, if shifter ring 43 is moved leftward with respect to its FIG. 2 position, the face gear on shifter ring 43 engages the face gear portion of retainer member 41 and couples worm wheel 38 to coupling 28 in fixed relation.

Forces are than transmitted from worm gear 37, through worm wheel 38, through retainer member 41, through the cooperating face gear of shifter ring 43, through splines 30, and into the principal or body portion of coupling 28. If shifter ring 43 is moved to the FIG. 2 condition, coupling 28 is mounted in free-wheeling relation to worm wheel 38 and worm gear 37.

Two other important features are shown in my actuator arrangement. A shifter ring 47 is provided for braking purposes. Such shifter ring is coupled to generally semicircular yoke 48 and arm 49. (Yoke 48 is shown in section only in FIG. 2.). Arm 49 rotates about pivot 50 in response to input forces applied to the arm. A brake ring 51 is secured to casing 15 by fasteners 53 and includes a brake lining designated 52. During braking operations the tapered surface of shifter ring 47 engages brake lining 52. Braking forces are developed in ring 51 and lining 52 and are applied through shifter ring 47, through splines 30, and to the principal body portion of coupling 28, as required. Brake ring 51 is also configured to retain tapered roller bearing 34 in a proper position. However, the brake components (47 through 53) are not used for locking purposes. Instead, a lock ring 54 is provided in my invention for use in securing coupling 28 and screw assemblies 11, 12 in rotationally fixed relation relative to housing 15. Lock ring 54 is provided with a face gear portion and is connected to housing 15 by fasteners 55. When the shifter ring 43 is moved to its extreme right position from its FIG. 2 position, the right face gear portion of shifter ring 43 engages the adjacent face gear portion of lock ring 54, thus securing screw assemblies 11, 12 in a rotationally locked condition.

In FIG. 3 I illustrate an aircraft 60 of the type having variable wing sweep with the actuator of this invention incorporated therein. Wings 61 and 62 are typically rotatably mounted to the fuselage of aircraft 60 in the region of points 63 and 64. Attach fittings 19 of the invention are coupled internally of and in non-rotatable relation to aircraft wings 61, 62 at the regions of the points designated 65. 65a shows the position of attach fitting 19 when the actuator and wings are retracted; point 65b shows the location of attach fitting 19 when the actuator is extended to move the wings to the position shown in solid lines in FIG. 3. The axes designated 66 and 67 in FIG. 1 of the drawings show the plan position of the screw assembly's longitudinal axes when the actuator is in its extended and retracted positions, respectively. Similar elevational position extremes are shown in FIG. 2.

It is to be understood that the forms of the invention herewith shown and described are to be taken as preferred embodiments of the same, but that various changes in the proportioning, size, and detail of parts may be resorted to without departing from the spirit of the invention or the scope of the following claims.

I claim:
1. In an actuator fixedly connected to supporting structure and positioned generally intermediate opposed movable loads, in combination:
   (a) separate rotatable screw members which are located along a generally continuous axis relative to each other,
   (b) nut members which are connected to the opposed loads in rotatably fixed relation and which are engaged with said screw members to move the opposed loads when said screw members are rotated,
   (c) ball heads which are fixedly connected to said screw members,
   (d) coupling means having sockets which receive and retain said screw member ball heads in fixed positions that are along said generally continuous axis and that are adjacent each other and which connect said screw member ball heads for synchronized rotation about said generally continuous axis, and
   (e) drive means fixedly connected to the supporting structure and to said coupling means,
said screw member ball heads being retained in said coupling member sockets in pivotable relation whereby said screw members are pivotable relative to said drive means.

2. The invention defined by claim 1, wherein said coupling means sockets are each provided with fixedly attached concave-crowned gear teeth, and wherein said ball heads are each provided with fixedly attached convex-crowned gear teeth, said gear teeth being in meshed relation to each other when said ball heads are pivoted relative to said coupling means sockets.

3. The invention defined by claim 1, wherein a tension load is applied to one of said screw members, said tension load being transmitted through said coupling means to the other of said screw members in by-pass relation to the supporting structure to which the actuator is fixedly connected.

4. The invention defined by claim 1, wherein a compression load is applied to one of said screw members, said compression load being transmitted through said coupling means to the other of said screw members in by-pass relation to the supporting structure to which the actuator is fixedly connected.

5. The invention defined by claim 1, wherein said coupling means is rotatably mounted in bearing means, said bearing means developing reaction forces substantially only in directions normal to said generally continuous axis when said coupling means is rotated by said drive means to move the opposed loads.

References Cited by the Examiner
UNITED STATES PATENTS

| | | |
|---|---|---|
| 2,504,018 | 4/1950 | Gibson et al. |
| 2,949,041 | 8/1960 | Wildhaber _____ 74—384 X |
| 3,135,497 | 6/1964 | Beck _____ 74—424.8 |

FOREIGN PATENTS 630,466  11/1961  Canada.

DON A. WAITE, *Primary Examiner.*